United States Patent [19]

Neumann et al.

[11] Patent Number: 4,865,081

[45] Date of Patent: Sep. 12, 1989

[54] MULTI-LUMEN TUBE ARRANGEMENT

[75] Inventors: Hans-Jürgen Neumann, St. Wendel; Wolfram Weber, Spiesen-Elversberg, both of Fed. Rep. of Germany

[73] Assignee: 501 Fresenius AG, Bad Homburg, Fed. Rep. of Germany

[21] Appl. No.: 98,494

[22] Filed: Sep. 18, 1987

[30] Foreign Application Priority Data

Sep. 23, 1986 [DE] Fed. Rep. of Germany ....... 3632241

[51] Int. Cl.⁴ .......................... F16L 9/18; F16L 11/12

[52] U.S. Cl. .................................... 138/111; 138/103; 138/109; 138/112; 29/456; 494/42

[58] Field of Search ................ 285/405; 138/103, 109, 138/111, 112, 114; 494/42, 18; 29/456; 264/339

[56] References Cited

U.S. PATENT DOCUMENTS

| | | | |
|---|---|---|---|
| 2,832,374 | 4/1958 | November | 285/405 X |
| 2,936,791 | 5/1960 | Farrar | 138/111 X |
| 3,646,972 | 3/1972 | Kuypers | 138/111 |
| 4,389,207 | 6/1983 | Bacehowski et al. | 138/111 X |

FOREIGN PATENT DOCUMENTS

| | | | |
|---|---|---|---|
| 2026648 | 2/1980 | United Kingdom | 138/114 |

*Primary Examiner*—James E. Bryant, III
*Attorney, Agent, or Firm*—Omri M. Behr

[57] ABSTRACT

Multi-lumen tube arrangement for use in a sliding-seal-free centrifuge comprising a plurality of equilength individual tubes (12, 14, 36, 38, 40, 42) which after a twisting about the longitudinal axis of the tube arrangement (10) are each held fixed free of tension at their ends (16–18).

10 Claims, 2 Drawing Sheets

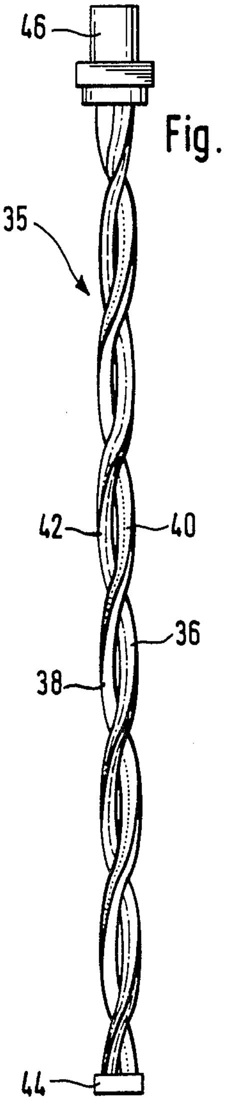
Fig. 2
Fig. 3
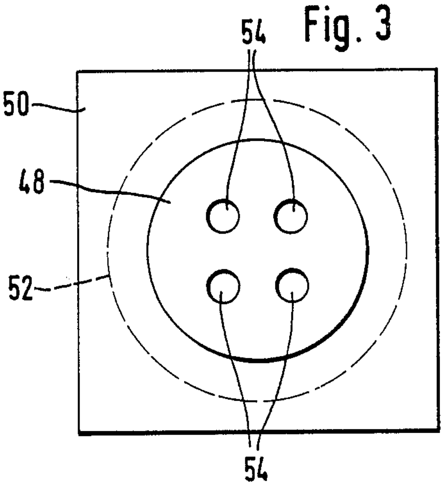

MULTI-LUMEN TUBE ARRANGEMENT

DESCRIPTION

The invention relates to a multi-lumen hose or flexible tube arrangement for use in a sliding-seal-free centrifuge, comprising a plurality of substantially equilength individual tubes which are turned around with respect to the longitudinal axis of the tube arrangement at least in partial regions and disposed in fixed position and a method for making the same.

Sliding-seal-free centrifuges are known for example from DE-OS Nos. 2,114,161 and 2,612,988. In such centrifuges a hose or flexible tube arrangement extends from a stationary point around the separation container to the other side of said separation container which is set in rotation via a drive unit. The tube is connected to the drive unit which turns with half the angular speed of rotation compared with the separation container. Due to the connection to the drive unit the tube is continuously turned around the separation container and due to the specific difference drive speeds between the drive unit and separation container is untwisted. Thus, in this respect a twisting or even a tearing of the tube is effectively prevented.

As apparent from DE-OS No. 2,612,988, FIGS. 5, 8 and 9, into the centrifuge a multi-lumen tube is inserted which comprises a plurality of fluid passages in a single flexible tube or hose. Such a multi-lumen tube has however several disadvantages including the relatively involved production and thus cost disadvantage compared with usual tubes. Since the multi-lumen tube has several passages it may have a relatively large diameter and this alone makes the tube relatively stiff so that a material must be used which has a relatively low Shore hardness. For this purpose soft PVC is used which on centrifuging in the aforementioned centrifuge is stretched because of its relatively soft properties. As a result the known multi-lumen tube is restricted to a speed of rotation of at the most 1600 rpm because otherwise the errors in the tube guiding become too large. Furthermore, such a soft material on centrifuging the centrifuge tends to deformation of the individual passages and this can lead to partial closing or slight clogging of said passages.

In the sliding-seal-free centrifuge described above the multi-lumen tube is continuously untwisted when entrained by the drive unit. When this is done and radially further advanced outer side of the tube comes to lie after half a revolution in the centrifuge on the inner side due to the untwisting treatment whilst on the other hand the inner side comes to lie on the outer side. Since the tube itself is radially curved during this untwisting treatment it undergoes a continuous fulling treatment because the tube is continuously lengthened on its outer side and compressed on its inner side. The energies arising as a result are relatively large and lead to a temperature rise of the tube. In this repsect this energy must be dissipated either through the material being centrifuged or through the guide tubes.

Such flexible guide tubes are inter alia also necessary because of the soft properties of the attached tube and lead to the disadvantage that closed centrifugation systems, for example a separation chamber with tubes connected thereto and supply bags, cannot be inserted in the centrifuge, or can be inserted only with great difficulty, because it is necessary either to thread the separation container or the remaining tube system through the guide means.

Finally, it is pointed out that the heat cannot be dissipated very well by such a guide means and that the friction of the tubes at the inner edges of the guide means generates heat which has a negative effect on the tube, apart from the simultaneously occurring mechanical abrasion.

U.S. Pat. No. 4,389,207 discloses a multi-lumen tube arrangement in which all the individual flexible tubes are first fixed at their two ends in connection members and thereafter twisted about the longitudinal axis of the tube arrangement. The fixing of the twisted tubes is by a binder in this twisted state in that the individual tubes are twisted not only about the longitudinal axis in helical manner but also with respect to the connecting members about their own individual tube axis. The fixing with binding agent over the entire tube arrangement results in an almost integral tube arrangement in which all the tubes during the centrifuging must follow the overall movement of the tube arrangement. This leads to a considerable fulling and bending stress of the individual tubes and thus to a danger of breakage when centrifuging is carried out for considerable periods.

A further tube arrangement is known from EP-A No. 62,038 in which individual tube regions are strengthened or thickened as regards material to be more resistant to fulling and bending stresses.

The invention is based on the problem of further developing the tube arrangement mentioned at the beginning so that the stressing by fulling or bending in centrifuging is minimized.

This problem is solved in that the individual tubes are arranged torsion-free about their own tube longitudinal axis, are each fixed in two end regions and are freely movable with respect to each other in the intermediate region lying therebetween.

According to the invention the multi-lumen tube arrangement consists of a plurality of individual tubes which are combined to form the tube arrangement according to the invention. This eliminates the complicated production of an integral multi-lumen arrangement so that the tube arrangement according to the invention as a whole is substantially more economical to make.

Furthermore, the individual tubes are either twisted about the longitudinal axis of the tube arrangement or alternatively about an axis parallel to said longitudinal axis. This twisted arrangement improves the stability of the tubes with respect to each other so that a fanning out of the individual tubes and thus mutual obstructing in the movement cannot occur, as might otherwise lead rapidly to twisting and tearing.

Furthermore, at their ends in this twisted state the individual tubes are fixed free of tension to each other. As a result the individual tube in the turned state is not twisted about its own longitudinal axis so that the entire arrangement after fixing remains in the turned state. As a result there is not danger of the tubes returning to their unturned initial state.

Finally, the tubes have substantially the same length. As a result all tubes are turned to approximately the same extents about the longitudinal axis of the tube arrangement or an axis parallel thereto. This avoids for instance a tube serving as auxiliary support for the other tubes taking up all the forces in the centrifugation treatment. Such a disadvantageous arrangement is for example disclosed in aforementioned DE-OS No. 2,114,161 in which the auxiliary support serves for stabilization and carrying away the forces. According to the invention all the individual tubes participate in the energy balance and thus mutually stabilize each other.

By the fixing of the tubes at their ends the use of flexible bundling aids not fixedly adhered is superfluous, for example rings, plastic bands, adhesive strips, and the like, which usually tend to slip on the centrifuge tubes and leave their predetermined positions.

When using the tube arrangement according to the invention in the sliding-seal-free centrifuge mentioned at the beginning it has been found that the tube arrangement according to the invention can readily be used at a speed of 2000 rpm and more. The tube arrangement remains stable and need not be guided in special guide aids.

The tubes used according to the invention consist of a polymeric material, in particular polyamide, polyethylene, polypropylene, polyurethane or polyvinyl chloride, which in particular can be used for medical purposes. Of these materials, polyamide is preferred.

As already mentioned at the beginning this material should be relatively rigid, and the Shore hardness R should be between 60 and 80, in particular about R 70, i.e. the tubes should be semi-rigid to almost rigid.

The individual tubes in the case of the example may have an internal diameter of about 2 mm and an external diameter of about 3.2 mm.

Because of their relatively large hardness the individual tubes used according to the invention are distinguished by high strength, for example resistance to elongation, bending or deviation. Furthermore, the internal diameters of the individual tubes can be kept substantially constant over the entire tube length so that there is no danger of clogging.

The tube arrangement according to the invention comprises generally 2–5 individual tubes, preferably 3 or 4 individual tubes.

As explained above these individual tubes are turned at least in partial regions round the longitudinal axis of the tube arrangement or an axis-parallel thereto resulting in a twisted bundle. The twisting is carried out by the usual techniques of cabling, tangling, twisting or plaiting.

The twisting of the individual tubes is carried out in the following manner.

The one ends of the individual tubes are fixed in a first adapter, for example by adhering or clamping.

The other ends of the loose individual tubes are introduced into a second adapter having corresponding receiving bores (matching holes) for the respective tube end. Said tube ends are freely movable in the matching hole about their longitudinal axis, i.e. the diameter of said matching hole is somewhat greater than the external diameter of the tube.

Now, to twist the tube bundle the second adapter is turned about the longitudinal axis of the tube arrangement whilst the first adapter is held fixed. According to a preferred embodiment the turning of the second adapter with respect to the first adapter is $(n+\frac{1}{2})$ times, n being zero or a whole number. Thus, in this respect the second adapter is turned either with half, one and a half . . . turns with respect to the first adapter. Particularly preferred according to the invention is a 3.5 times turning of the individual tubes.

During this rotation the individual tubes can remain stationary in space because of their loose fit within the receiving bores, i.e. the individual tubes do not execute any twisting about their own longitudinal axis and therefore turn in the opposite sense within the receiving bores during this turning treatment.

After the twisting the individual tubes are fixedly connected to the second adapter, for example by an adhesive treatment. After the connection the individual tubes remain in the twisted array.

Instead of the adapters the individual tubes can of course be clamped in corresponding apparatus parts which are then turned with respect to each other.

The tubes can then finally be directed adhered together at their ends without having to use adapters.

Finally, the first ends of the tubes can also be connected to the inlet and outlet tubes of the separation chamber to be used in the centrifuge, and it is then again possible to twist the other ends in the manner described above with respect to the fixed ends.

According to a further advantageous embodiment the untwisting treatment of the individual tubes in the receiving bores can be promoted in the following manner:

Before or after the twisting the loose second adapter is displaced in the direction of the fixed adapter, in the one case the twisting treatment then being carried out and said second adapter then pushed back again to the second ends. This shifting treatment may possibly be carried out several times to further promote an untwisting of the individual tubes.

Hereinafter two examples of embodiment will be described with the aid of the drawings, wherein:

FIG. 1*a* shows perspectively two individual tubes with adapters which are not twisted;

FIG. 1*b* shows two individual tubes twisted with 3.5 revolutions,

FIG. 2 shows four individual tubes twisted with 3.5 revolutions and

FIG. 3 is a plan view of the adapter used according to FIG. 2.

Figure 1A:
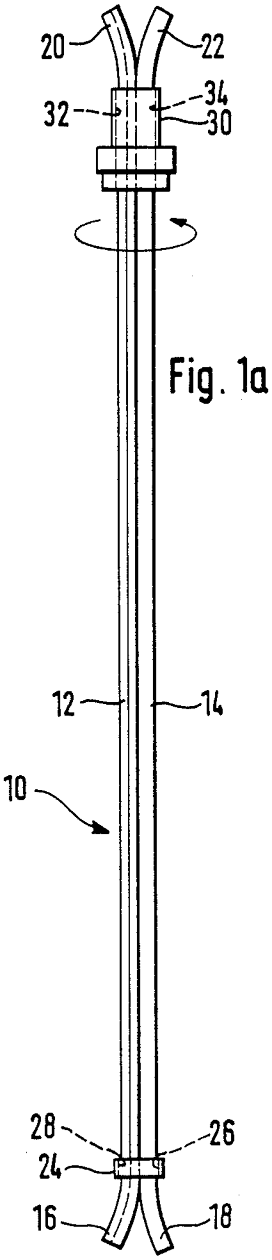

In FIG. 1 the tube arrangement according to the invention is designated by 10. This tube arrangement consists of two individual tubes 12 and 14 in an embodiment shown in FIG. 1*a* in the untwisted state. These individual tubes each have a first end 16 and 18 respectively and a second end 20 and 22.

As mentioned above the individual tubes consist of a polymeric material having the aforementioned dimensions and Shore degree of harness.

When referring to ends according to the invention the tube ends are meant from which the tube regions extend which participate in the centrifugation treatment. If the tube arrangement 10 according to the invention is used in the centrifuge according to DE-OS No. 2,612,988 the second ends terminate at the exit of the tube arrangement from the centrifuge on the one hand and on the other hand at the return of the tube to the central axis of the centrifuge from which the individual tubes extend to the separation containers.

As shown in FIG. 1*a* the two ends 20 and 22 therefore fan out again because they are arranged outside the centrifuge, but this need not necessarily be the case.

Similarly, the first ends 16 and 18 fan out because in this case the tube arrangement is returned to the axis of rotation of the centrifuge and consequently there is no need to subject the tube arrangement 10 to an untwisting treatment. Thus, between the first ends 16 and 18 and the second ends 20 and 22 the tube regions are disposed which in the sliding-seal-free centrifuge must be subjected to the untwisting treatment.

The first ends 16 and 18 are fixed in a first holder piece 24 which for receiving the individual tubes 12 and 14 comprises corresponding bores 26 and 28. Into the bores 26 and 28 the tubes 12 and 14 are stuck, for example by thermal or solvent welding.

Second ends 20 and 22 are disposed in a second holding piece 30 which for this purpose comprises corresponding bores 32 and 34 for receiving the tubes 12 and 14. Said bores 32 and 34 are shown in dashed line in FIG. 1*a*.

As already described above the diameter of the bores 32 and 34 is somewhat greater than the outer diameter of the tubes 12 and 14 so that the latter can freely move and twist therein.

Figure 1B:
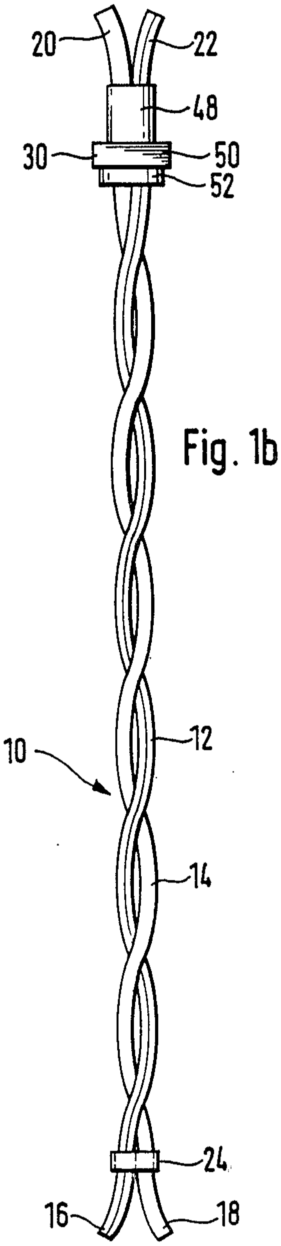

FIG. 1*b* then shows the embodiment illustrated in FIG. 1*a* twisted about the longitudinal axis of the tube arrangement 10. For this purpose, as indicated in FIG. 1*a* by the arrow the second holding piece is turned anticlockwise whilst the first holding piece is held fixed to prevent rotation. Since the tubes 12 and 14 can freely turn in the bores 32 and 34 the tubes only execute the twisting about the common longitudinal axis but do not twist themselves about their own axis.

As further apparent from FIG. 1*b* the tube length between the two holding pieces 24 and 26 remains constant for both individual tubes 12 and 14.

It is further apparent from FIG. 1*b* that the twisting of the individual tubes is with 3.5 revolutions of the second holding piece 30 with respect to the first holding piece 24.

When the individual tubes 12 and 14 have assumed their equilibrium position, which can be favoured inter alia by displacing the second holding piece or adapter 30 along the common longitudinal axis towards the first holding piece 24 and then moving it back to the starting point again without cancelling the twisting, the second ends 20 and 22 are also firmly connected to the second holding piece 30 and this can again be done by welding in or clamping.

The tube arrangement 10 in the form once fixed then remains in the twisted position of the two individual tubes 12 and 14.

In FIG. 2 a further embodiment is shown in which four individual tubes 36, 38, 40, 42 with a cabling degree of 3.5 are arranged between the first holding piece 44 and the second holding piece 46. For reasons of clarity the projecting ends of the individual tubes 36–42 have been omitted in FIG. 2.

Such an arrangement can be used for example for the separation of blood, the first tube serving for the introduction of full blood into the separating chamber and the other three tubes for withdrawing erythrocytes, the buffy-coat and the plasma.

The first and second holding pieces 44 and 46 then again have corresponding bores which for clarity are not shown in FIG. 2. They are however to be seen in FIG. 3 in which the second holding piece 46 is shown in plan view.

The tube arrangement 35 shown in FIG. 2 is again twisted with a twisting degree of 3.5 so that the method of making said tube arrangement 35 corresponds to the method of making the tube arrangement 10 according to FIG. 1. In this respect reference is made to the latter.

In FIG. 3 the second holding piece 46 is shown in plan view. Said second holding piece 46 consists of a cylindrical portion 48 followed by a collar 50 from which in turn a cylindrical portion 52 extends having a diameter less than that of the collar but greater than that of the cylindrical portion 48. The cylindrical portion 48, the collar 50 and the cylindrical portion 52 are provided with through bores 54, four in the example, to accommodate the individual tubes 36–42.

The collar 50 in the embodiment shown in FIG. 3 is made square and is disposed in a correspondingly formed recess in the cover, not illustrated, of a centrifuge during the separation process. This ensures firstly the correct position of the tube arrangement 35 and secondly prevents twisting of the tube arrangement during centrifuging.

We claim:

1. A multi-lumen tube arrangement, comprising a plurality of individually torsion free tubes, made by the steps of (a) providing a plurality of substantially equal length individual tubes each having a first and a second end.

(b) setting said first and said second ends respectively in a first and second end region, by (bi) inserting each of the said first and said second ends of the individual tubes into a first and a second holding piece respectively in each of said first and said second end regions respectively, said holding pieces comprising a plurality of bores for receiving the individual tubes, the diameter of the said bores being greater than the external diameter of the individual tubes so that the individual tubes can relax during the turning treatment and (bii) fixing said first ends of said tubes in said first holding pieces, while the second ends of said individual tubes are loosely held in the respective second holding pieces.

(c) turning said tubes about the longitudinal axis of the tube arrangement at least in partial regions, in a torsion free manner about said axis, wherein the first end region of the individual tubes is twisted with respect to the second end region by $n+\frac{1}{2}$ revolutions, n being zero or a whole number, by (ci) rotationally displacing said second holding piece with respect to the first holding piece by at least a $\frac{1}{2}$ revolution and (d) after conclusion of the said turning step, fixing said tubes in said second end regions by fixing the second ends in said second holding piece.

2. A tube arrangement according to claim 1 wherein the turning includes or plaiting.

3. A tube arrangement according to claim 1 wherein at least one of the individual tubes is wound round another individual tube at least in partial regions.

4. A tube arrangement according to claim 3 wherein the winding round is effected as plaiting.

5. A tube arrangement according to claim 1 containing 2–5, individual tubes.

6. A tube arrangement according to claim 1 containing 3–4, individual tubes.

7. A tube arrangement according to claim 1 wherein the respective tube ends are adhered in, welded in or clamped in the respective holding pieces.

8. A tube arrangement according to claim 1 wherein the material of the individual tubes consists of polyamide, polyethylene, polypropylene, polyurethane or polyvinyl chloride.

9. A tube arrangement according to claim 8 wherein the material has a Shore hardness R of 60–80, in particular about 70.

10. A tube arrangement according to claim 1 wherein the individual tubes are twisted by about 3.5 revolutions.

* * * * *